(12) United States Patent
Sychingping

(10) Patent No.: US 10,715,819 B2
(45) Date of Patent: Jul. 14, 2020

(54) METHOD AND APPARATUS FOR REDUCING FLICKER

(71) Applicant: CANON KABUSHIKI KAISHA, Tokyo (JP)

(72) Inventor: Kenric O. Sychingping, Manila (PH)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 15/498,119

(22) Filed: Apr. 26, 2017

(65) Prior Publication Data

US 2018/0316932 A1 Nov. 1, 2018

(51) Int. Cl.

| | |
|---|---|
| *H04N 19/176* | (2014.01) |
| *H04N 19/103* | (2014.01) |
| *H04N 19/159* | (2014.01) |
| *H04N 19/513* | (2014.01) |
| *H04N 19/567* | (2014.01) |
| *H04N 19/154* | (2014.01) |

(52) U.S. Cl.
CPC ......... *H04N 19/176* (2014.11); *H04N 19/103* (2014.11); *H04N 19/154* (2014.11); *H04N 19/159* (2014.11); *H04N 19/521* (2014.11); *H04N 19/567* (2014.11)

(58) Field of Classification Search
CPC .. H04N 19/176; H04N 19/103; H04N 19/154; H04N 19/159; H04N 19/521; H04N 19/567

See application file for complete search history.

(56) References Cited

U.S. PATENT DOCUMENTS

| | | | |
|---|---|---|---|
| 8,325,799 B2 | 12/2012 | Chono | ..................... 375/240.03 |
| 8,446,950 B2 * | 5/2013 | Rieder | ................... H04N 19/51 |
| | | | 348/409.1 |
| 2001/0003535 A1 * | 6/2001 | Kameyama | ............ H04N 5/145 |
| | | | 375/240.16 |
| 2004/0233991 A1 * | 11/2004 | Sugimoto | ............ H04N 19/139 |
| | | | 375/240.16 |
| 2009/0110060 A1 * | 4/2009 | Cortes | .................... H04N 19/46 |
| | | | 375/240.02 |
| 2009/0168878 A1 | 7/2009 | Kawashima | ............. 375/240.13 |
| 2009/0274215 A1 * | 11/2009 | Metsugi | .................. H04N 19/52 |
| | | | 375/240.16 |

(Continued)

FOREIGN PATENT DOCUMENTS

WO WO-2019190224 A1 * 10/2019 ............. H04N 19/51

*Primary Examiner* — Maria E Vazquez Colon
(74) *Attorney, Agent, or Firm* — Venable LLP

(57) ABSTRACT

There is provided an image encoding apparatus that divides an image in a video into blocks made up of a plurality of pixels, and encodes the blocks, the image encoding apparatus comprising: A first motion vector computation unit configured to compute a first motion vector of a block to be encoded in an image to be encoded; A motion vector modification unit configured to modify the first motion vector computed in the first motion vector computation unit to generate a second motion vector when a first condition is satisfied; Wherein the first condition is at least one of the following conditions: The absolute value of the first motion vector is greater than a first threshold The absolute value of the difference between the first motion vector and the candidate motion vector for modifying the first motion vector is greater than a second threshold.

10 Claims, 8 Drawing Sheets

Block diagram of the INTER prediction module

(56) References Cited

U.S. PATENT DOCUMENTS

2010/0239019 A1\* 9/2010 Bock .................... H04N 19/513
  375/240.16
2012/0201293 A1\* 8/2012 Guo ....................... H04N 19/51
  375/240.02

\* cited by examiner

Block diagram of the INTER prediction module

Flowchart of procedure to modify the motion vector

Block diagram of the mode decision module

Flowchart of procedure to modify the coding mode

METHOD AND APPARATUS FOR REDUCING FLICKER

BACKGROUND OF THE INVENTION

Field of the Invention

The present invention relates to a method and apparatus for image encoding.

Description of the Related Art

In an image encoded by an image encoding apparatus, flicker is observed in flat areas.

A related art, US2009/0168878, disclosed a method for reducing intra flicker in P-frames by applying smaller quantization parameters to "still and flat" areas.

Another related art, U.S. Pat. No. 8,325,799, also performs flicker suppression by applying smaller quantization parameters in I-frames.

The solutions disclosed by the related arts will reduce occurrences of flicker, but at the cost of compression ratio.

SUMMARY OF THE INVENTION

In an image encoded by an image encoding apparatus, flicker is observed in flat areas. The flicker is caused by the decorrelation of the prediction errors in between frames. Also, if the size of the block where flicker occurs is bigger, the flicker becomes more noticeable.

In reference to FIG. 2, INTRA flicker occurs in flat areas when the selected INTRA prediction modes are different between blocks in the same spatial location but in different frames, the blocks referred to as collocated blocks.

On the other hand, similar issue also occurs for INTER prediction. INTER flicker occurs in flat areas when the selected motion vectors are different between collocated blocks. This can result to blocks located in the flat areas to have incorrect or inappropriate motion vectors.

The present invention relates to methods and apparatus for reducing occurrences of flicker by modifying the motion vector and the prediction mode of the block.

DESCRIPTION OF THE EMBODIMENTS

Figure 8:
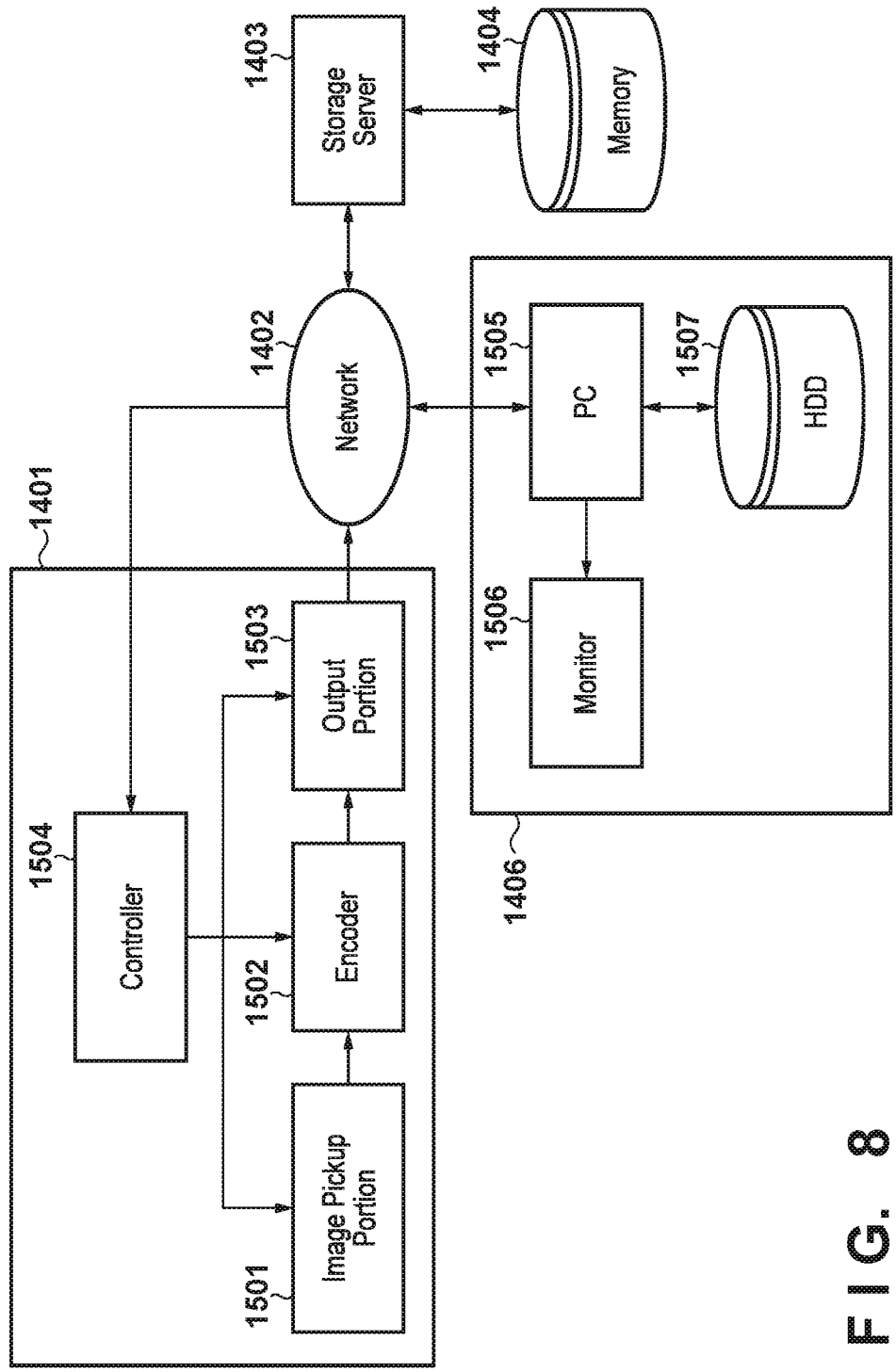
FIG. 8 is a block diagram of an example system according to the embodiment.

FIG. 8 is a block diagram that illustrates an internal structure of the image pickup apparatus 1401 and the moving image reproducing apparatus 1406. Referring to FIG. 8, a PC 1505 is an information processing apparatus that includes a computer-readable memory storing a program for operating the moving image reproducing apparatus 1406 and that also includes a controller executing the program. The PC 1505 receives moving image data from the image pickup apparatus 1401 or the storage server 1403 having the memory 1404 over the network 1402, causes a hard disk drive (HDD) 1507 to store the received moving image data, and causes a monitor 1506 to display it. The HDD 1507 can be another type of memory, such as a flash memory.

An image pickup portion 1501 can be composed of an image sensor. An encoder 1502 encodes moving image data obtained by the image pickup portion 1501. An output portion 1503 outputs the moving image data to the moving image reproducing apparatus 1406 or the storage server 1403 over the network 1402.

A controller 1504 controls the entire system of the image pickup apparatus 1401. For example, in response to the instruction from the moving image reproducing apparatus 1406, the controller 1504 instructs the image pickup portion 1501, the encoder 1502, and the output portion 1503 to start an image capturing operation. The obtained moving image data is output from the output portion 1503 to the moving image reproducing apparatus 1406 and the storage server 1403 having a memory 1404 over the network 1402.

In the moving image reproducing apparatus 1406, the PC 1505 stores moving image data output from the output portion 1503 in the HDD 1507. When receiving an operation to finish image capturing from a user, the PC 1505 provides the image pickup apparatus 1401 with an instruction to finish image capturing. In the embodiment, the encoder 1502 is described below.

Figure 1:
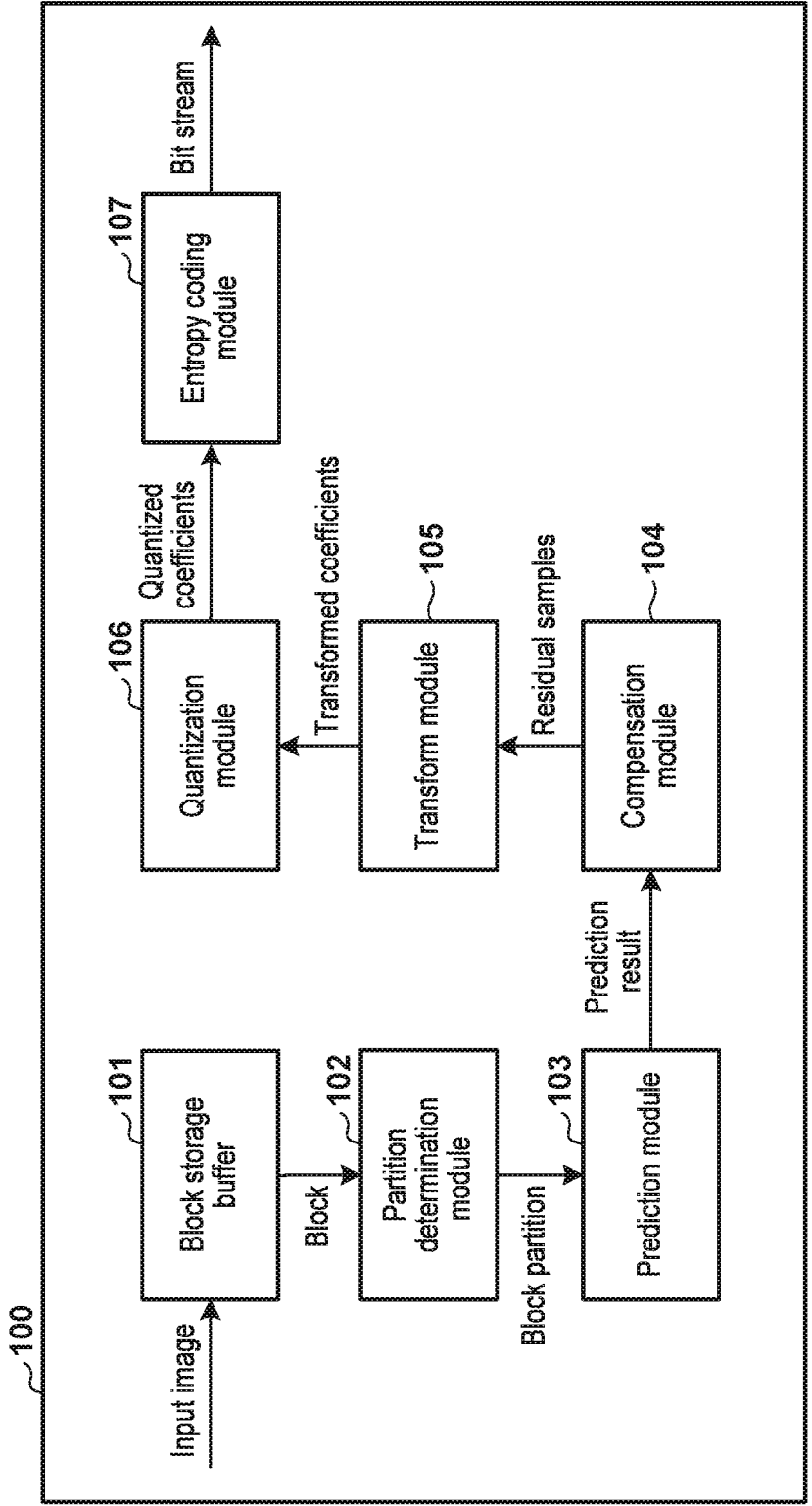
FIG. 1 is a block diagram of the image encoding apparatus regarding the invention.
Figure 2:
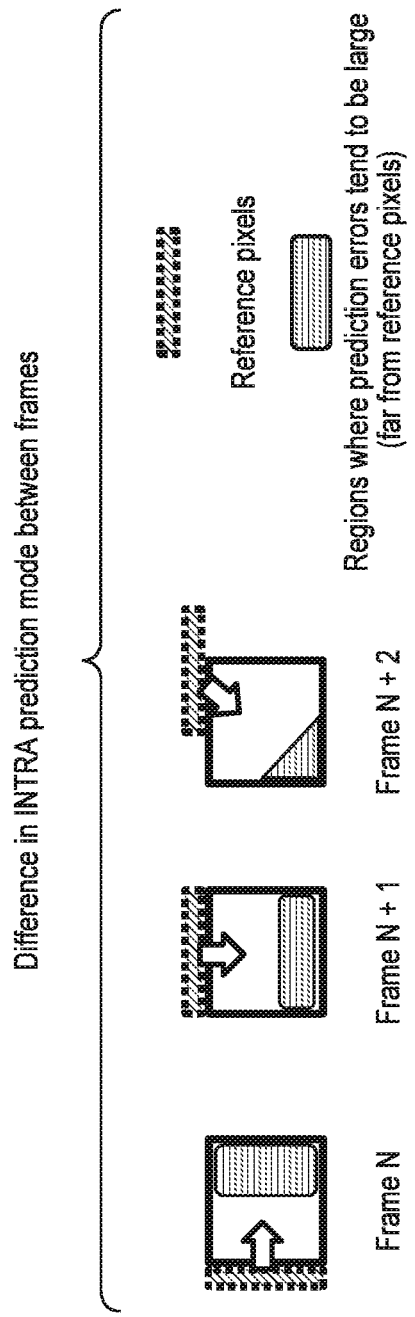
FIG. 2 is a diagram showing difference in selected INTRA prediction modes between collocated blocks.

In reference to FIG. 1, 100 illustrates the image encoding apparatus regarding the invention. The image encoding apparatus is composed of a block storage buffer 101, a partition determination module 102, a prediction module 103, a compensation module 104, a transform module 105, a quantization module 106, and an entropy encoding module 107.

The input image is divided into blocks and the blocks are stored in the block storage buffer 101. Then, the block storage buffer 101 sends the blocks to the partition determination module 102.

The partition determination module 102 further divides the blocks obtained from the block storage buffer into smaller blocks, referred to as partition. Then, the partition determination module 102 sends the partition of the block to be encoded to the prediction module 103.

The prediction module 103 performs INTRA prediction to generate an INTRA prediction mode; performs INTER prediction to generate a motion vector, and performs prediction mode selection to generate a prediction mode for each partition. The generated INTRA prediction mode, motion vector and prediction mode are referred to as prediction results. Then, the prediction module 103 sends the prediction results to the compensation module 104.

The compensation module 104 performs compensation using the prediction results, obtained from the prediction module 103, to generate residual samples. Then, the compensation module 104 sends the residual samples to the transform module 105.

The transform module 105 performs forward transformation on the residual samples, obtained from the compensation module 104, to generate transformed coefficients. Then, the transform module 105 sends the transformed coefficients to the quantization module 106.

The quantization module 106 performs quantization on the transformed coefficients, obtained from the transform module 105, to generate quantized coefficients. Then, the quantization module 106 sends the quantized coefficients to the entropy coding module 107.

The entropy coding module 107 performs entropy-encoding to the quantized coefficients, obtained from the quantization module 106. Then, the entropy coding module 107 outputs the encoded bit stream.

Figure 3:
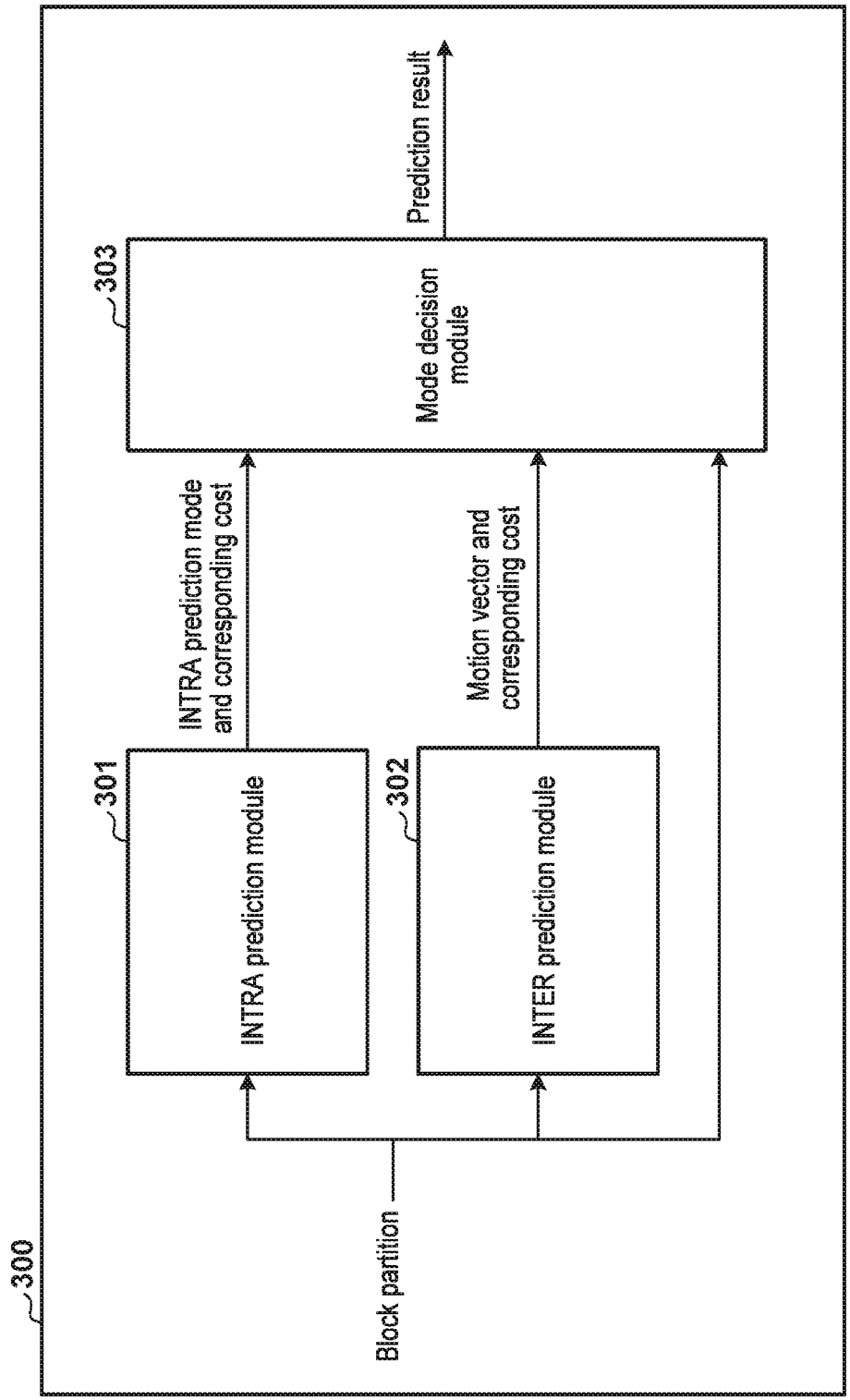
FIG. 3 is a block diagram of the prediction module.

In reference to FIG. 3, 300 corresponds to the prediction module 103. The prediction module 103 is composed of an INTRA prediction module 301, an INTER prediction module 302, and a mode decision module 303.

The INTRA prediction module 301 performs INTRA prediction on the current partition by selecting the INTRA prediction mode with the smallest encoding cost. The selected INTRA prediction mode and its corresponding encoding cost, referred to as INTRA prediction result, are sent to the mode decision module 303.

The INTER prediction module 302 performs INTER prediction on the current partition by selecting the motion vector with the smallest encoding cost. The selected motion vector and its corresponding cost, referred to as INTER prediction result are sent to the mode decision module 303.

The mode decision module 303 selects the prediction mode for the current partition using the INTRA prediction result, which is obtained from the INTRA prediction module 301, and the INTER prediction result which is obtained from INTER prediction module 302. Then, the mode decision module 303 sends the prediction results to the compensation module 104.

Figure 4:
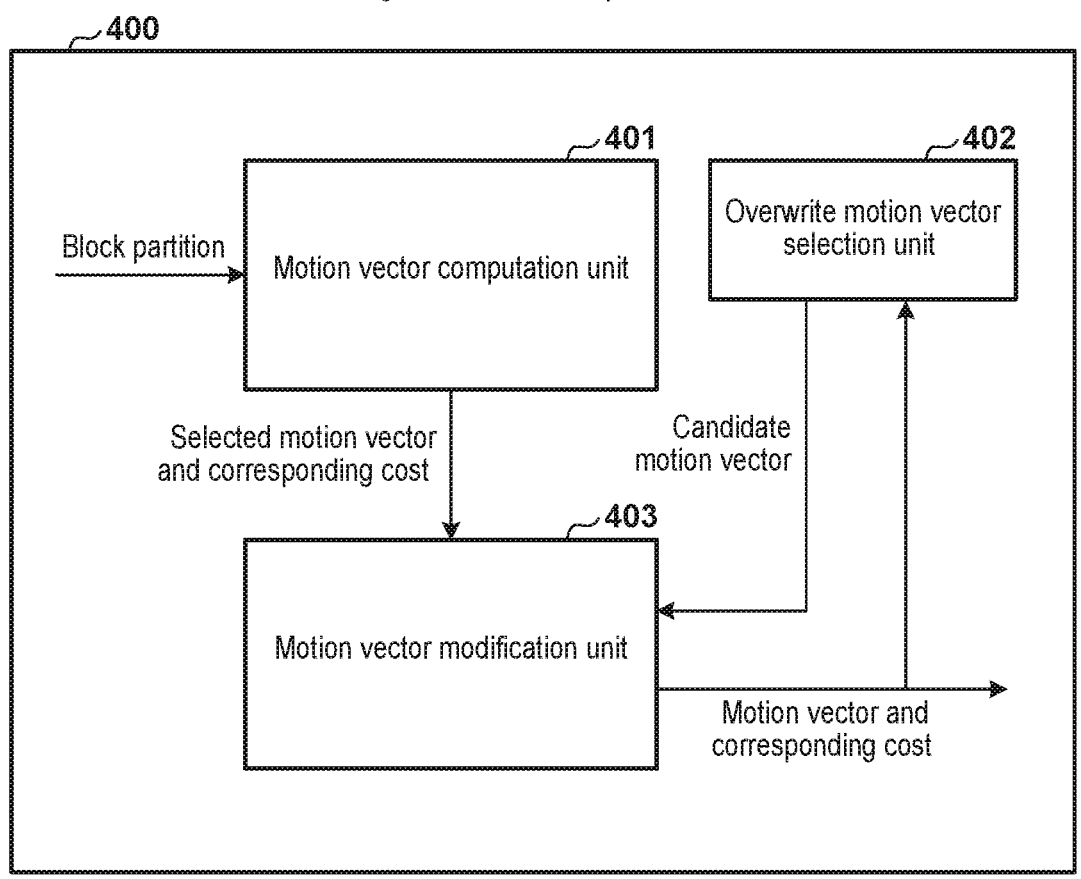
FIG. 4 is a block diagram of the INTER prediction module located in the prediction module.

In reference to FIG. 4, 400 corresponds to the INTER prediction module 302. The INTER prediction module is composed of a motion vector computation unit 401, an overwrite motion vector selection unit 402, and a motion vector modification unit 403.

The motion vector computation unit 401 selects the motion vector of the current partition by choosing the motion vector with the smallest encoding cost. Then, the selected motion vector and its corresponding encoding cost are sent to the motion vector modification unit 403.

The overwrite motion vector selection unit 402 selects the motion vector to be used for replacing the motion vector selected by the motion vector computation unit 401, the motion vector referred to as the overwrite motion vector. First, the overwrite motion vector selection unit 402 computes the encoding cost of the following: the encoding cost of the current partition if the motion vector of the partition located above is used, the encoding cost of the current partition if the motion vector of the partition located to the above-left is used, the encoding cost of the current partition if the motion vector of the partition located above-right is used, and the encoding cost of the current partition if the motion vector of the partition located to the left is used. Then, the overwrite motion vector is set equal to the motion vector with smallest encoding cost. Alternatively, the overwrite motion vector selection unit 402 may select multiple motion vectors of neighboring partitions, such as the above partition, above-left partition, above-right partition, and left partition, as overwrite motion vectors. If the above partition, the above-left partition, the above-right partition and the left partition are unavailable (i.e., the current partition is the first partition to be encoded in the frame), the overwrite motion vector is set equal to a zero vector instead. Then, the overwrite motion vector selection unit 402 sends the overwrite motion vector to the motion vector modification unit 403.

The motion vector modification unit 403 computes the encoding cost of the overwrite motion vector obtained from the overwrite motion vector selection unit 402 and determines if the motion vector selected by the motion vector computation unit 401 should be replaced with the overwrite motion vector. If the overwrite motion vector selection unit 402 selects multiple overwrite motion vectors, the motion vector modification unit 403 will process each overwrite motion vector obtained from the overwrite motion vector selection unit 402 and to determine which overwrite motion vector is appropriate for replacing the motion vector selected by the motion vector computation unit 401. If there are multiple overwrite motion vectors that are appropriate for replacing the motion vector selected by the motion vector computation unit 401, the motion vector modification unit will replace the motion vector selected by the motion vector computation unit 401 with the overwrite motion vector with the smallest encoding cost. Then, the motion vector modification unit 403 will send the updated motion vector and its corresponding encoding cost to the overwrite motion vector selection unit 402 and the mode decision module 303. Steps on how the motion vector selected by the motion vector computation unit 401 is replaced by a motion vector obtained from the overwrite motion vector selection unit 402 will be specified later.

Figure 6:
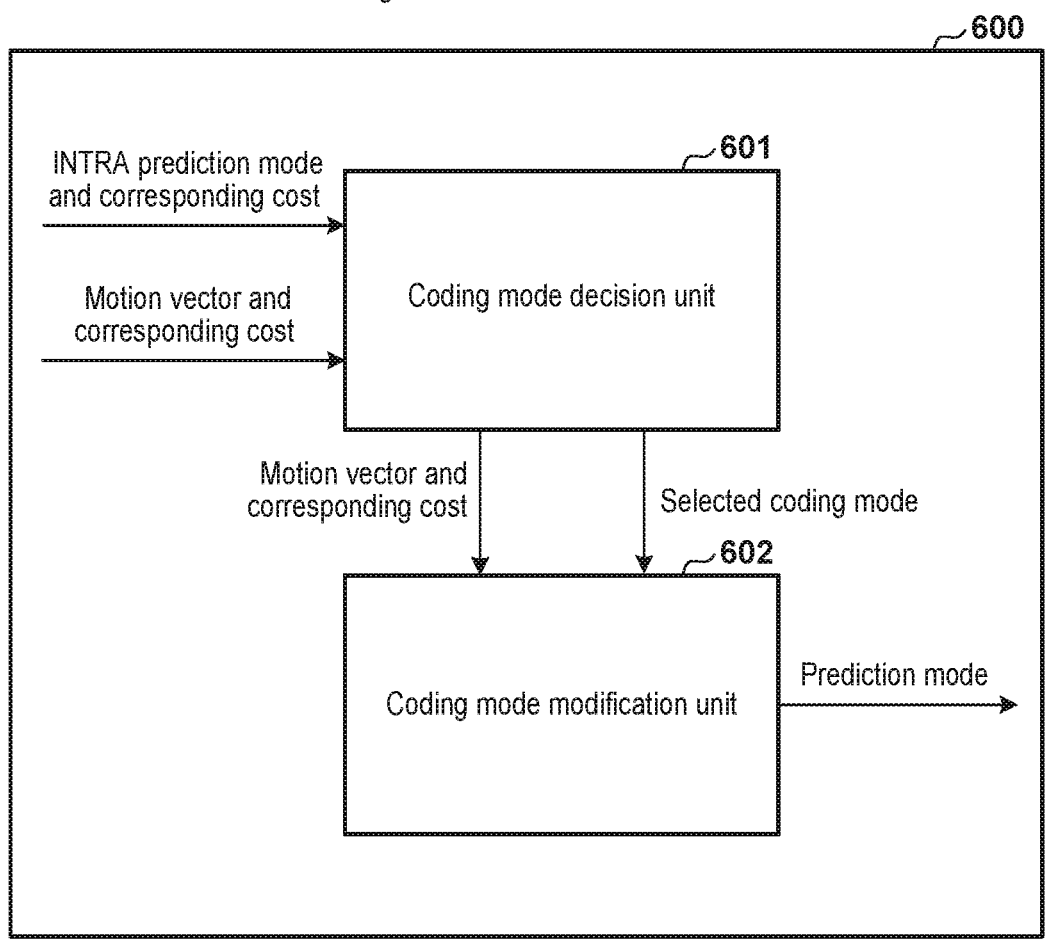
FIG. 6 is a block diagram of the mode decision module located in the prediction module.

In reference to FIG. 6, 600 corresponds to the mode decision module 303. The mode decision module 303 is composed of a coding mode decision unit 601 and a coding mode modification unit 602.

The coding mode decision unit 601 obtains the INTRA prediction mode of the current partition and its corresponding encoding cost from the INTRA prediction module 301 and the motion vector of the current partition and its corresponding cost from the INTER prediction module 302. Next, the coding mode decision unit 601 will select INTRA prediction or INTER prediction depending on which prediction mode has the smaller encoding cost. Then, the coding mode decision unit 601 sends the motion vector of the current partition and its corresponding cost and the selected prediction mode, referred to as coding mode, to the coding mode modification unit 602.

Then, the coding mode modification unit 602 determines if the coding mode selected by the coding mode decision unit 601 should be replaced with an INTER prediction. Steps on how the coding mode selected by the coding mode decision unit 601 is replaced with an INTER prediction will be specified later.

First Embodiment

Figure 5:
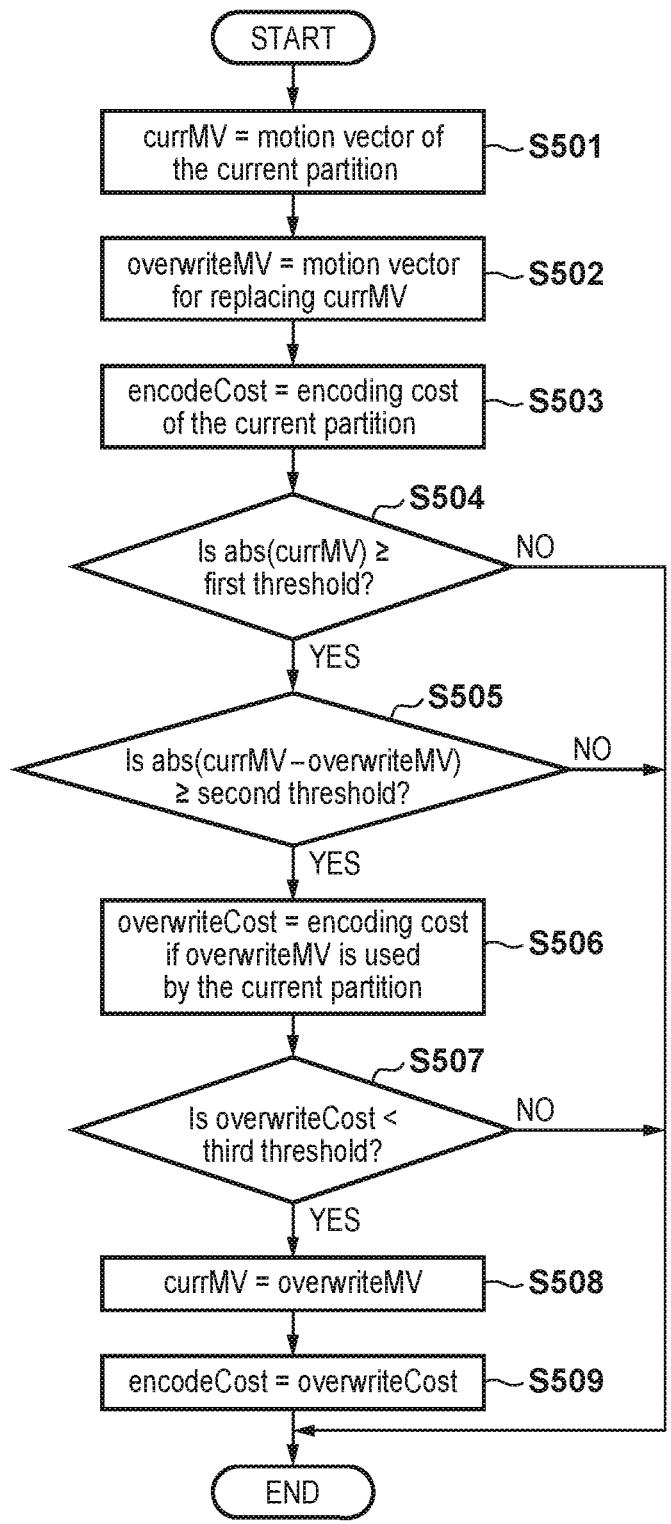
FIG. 5 is a flowchart depicting the procedure performed by the motion vector modification unit to modify the motion vector selected by the motion vector computation unit.

FIG. 5 corresponds to the procedure performed by the motion vector modification unit 403 to replace the motion vector selected by the motion vector computation unit 401 with a motion vector obtained from the overwrite motion vector selection unit 402.

In step S501, a parameter currMv is set equal to the motion vector selected by the motion vector computation unit 401 for the current partition.

In step S502, a parameter overwriteMv is set equal to the motion vector obtained from overwrite motion vector selection unit 402.

In step S503, a parameter encodeCost is set equal to the encoding cost corresponding to the motion vector of the current partition, which is obtained from the motion vector computation unit 401.

In step S504, the absolute value of the parameter currMv is checked if it is greater than or equal to the first threshold.

The first threshold is used to check if the currMv is appropriate for the partition located in flat areas. The first threshold is set depending on the quantization parameter of the current partition. If the current partition has a larger quantization parameter, a large threshold value is set to the first threshold. Likewise, if the current partition has a smaller quantization parameter, a small threshold value is set to the first threshold.

The first threshold can also be set based on the flatness or the pixel level of the current partition. For example, the flatness of the current partition can be checked by computing the activity value of the current partition. The activity value is computed by obtaining the sum of the difference between each pixel value in the current partition with the average pixel value in the current partition. If the activity value of the current partition is smaller, a large threshold value is set to the first threshold. Likewise, if the activity value of the current partition is larger, a small threshold value is set to the first threshold.

In step S505, the absolute value of the difference between the parameter currMv and the parameter overwriteMv is checked if it is greater than or equal to a second threshold.

The second threshold is used to check if it is appropriate to use the overwriteMv instead of the currMv for the current partition. The second threshold value is set depending on the quantization parameter of the current partition. If the current partition has a larger quantization parameter, a large threshold value is set to the second threshold. Likewise, if the current partition has a smaller quantization parameter, a small threshold value is set to the second threshold.

The second threshold can also be set based on the flatness or the pixel level of the current partition. If the activity value of the current partition is smaller, a large threshold value is set to the second threshold. Likewise, if the activity value of the current partition is larger, a small threshold value is set to the second threshold.

In step S506, a parameter overwriteCost is set equal to the encoding cost corresponding to the current partition if the overwriteMv is used.

In step S507, the parameter overwriteCost is checked if it is less than a third threshold.

The third threshold is used to check if using the overwriteMv will result to degrade in compression result. The third threshold is set depending on the quantization parameter of the current partition. If the current partition has a larger quantization parameter, a large threshold value is set to the third threshold. Likewise, if the current partition has a smaller quantization parameter, a small threshold value is set to the third threshold.

The third threshold can also be set based on the flatness or the pixel level of the current partition. If the activity value of the current partition is smaller, a large threshold value is set to the third threshold. Likewise, if the activity value of the current partition is larger, a small threshold value is set to the third threshold.

In step S508, the parameter currMv is updated to be equal to the overwriteMv.

In step S509, for consistency with the modification of the motion vector of the current partition, the parameter encodeCost is updated to be equal to the parameter overwriteCost.

Following the above steps will result to reduction of instances of INTER flicker since blocks located in flat areas will now have correct or appropriate motion vectors.

Second Embodiment

Figure 7:
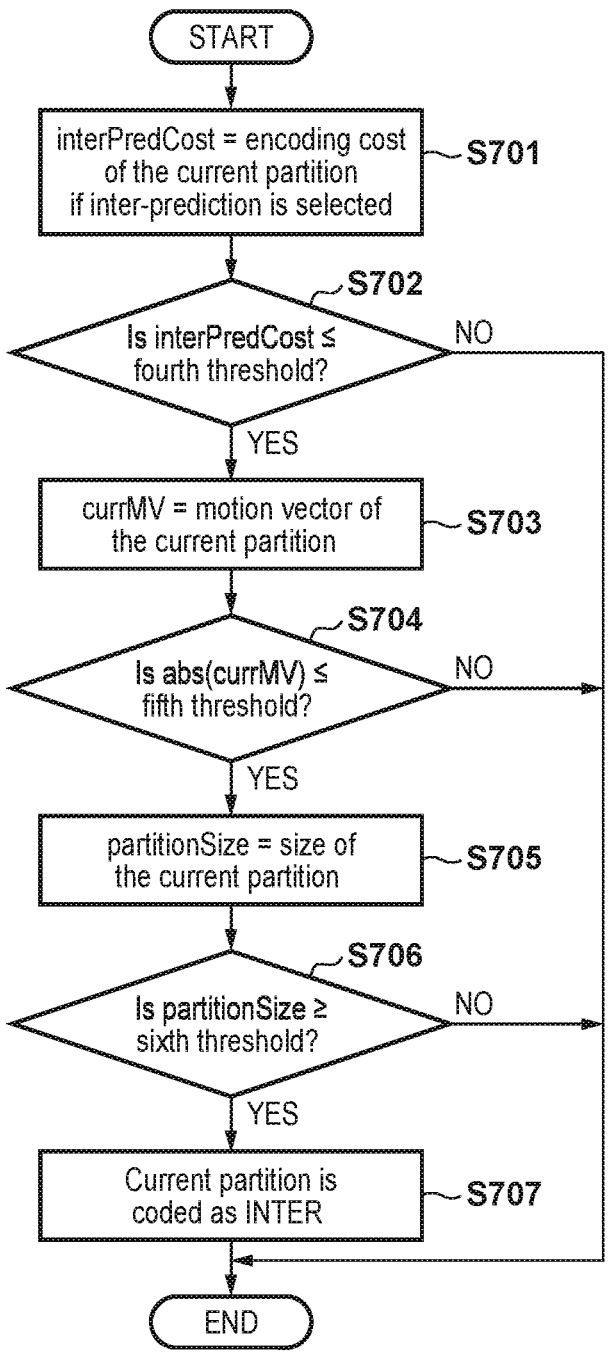
FIG. 7 is a flowchart depicting the procedure performed by the mode decision modification unit to modify the prediction mode selected by the mode decision modification unit to an INTER prediction.

FIG. 7 corresponds to the procedure performed by the coding mode modification unit 602 to replace the coding mode selected by the coding mode decision unit 601 with an INTER prediction mode.

In step S701, a parameter interPredCost is set equal to the encoding cost of the current partition if INTER prediction mode is selected, which obtained by the mode decision module 303 from the INTER prediction module 302.

In step S702, the fourth and fifth threshold values are set depending on the quantization parameter of the current partition. Larger threshold values are set to the fourth and fifth threshold if the quantization parameter of the current partition is large. Likewise, smaller threshold values are set to the fourth and fifth threshold if the quantization parameter of the current partition is small. Then, the sixth threshold is set.

In step S702, the parameter interPredCost is checked if it is less than or equal to a fourth threshold.

The fourth threshold is used to check if coding the current partition as INTER would result to degrade in the compression result. The fourth threshold value is set depending on the quantization parameter of the current partition. If the current partition has a larger quantization parameter, a large threshold value is set to the fourth threshold. Likewise, if the current partition has a smaller quantization parameter, a small threshold value is set to the fourth threshold.

In step S703, the parameter currMv is set equal to the motion vector of the current partition, which is obtained by the mode decision module 303 from the INTER prediction module 302.

In step S704, the parameter currMv is checked if it is less than or equal to a fifth threshold.

The fifth threshold is used to check if the currMv is appropriate for the partition located in flat areas. The fifth threshold value is set depending on the quantization parameter of the current partition. If the current partition has a larger quantization parameter, a large threshold value is set to the fifth threshold. Likewise, if the current partition has a smaller quantization parameter, a small threshold value is set to the fifth threshold.

In step S705, a parameter partitionSize is set equal to the size of the current partition.

In step S706, the parameter partitionSize is checked if it is greater than or equal to a sixth threshold.

The parameter partitionSize is compared with the sixth threshold to check if the size of the current partition is large enough for flicker to be observed.

In step S707, the mode decision of the current partition is set equal to INTER prediction mode.

Following the above steps will result to reduction of instances of INTRA flicker since the blocks located in the flat areas will now be coded as INTER.

In the embodiments specified above, the size of the partition is determined in the partition determination module 102 and is not modified in the succeeding modules. The size of partition may also be modified to be equal to block size in the motion vector modification unit 403 or in the coding mode modification unit 602. Modifying the size of the partition in the motion vector modification unit 403 should result to the steps specified in the first embodiment to be performed only once for the blocks in the flat areas. Likewise, modifying the size of the partition in the coding mode modification unit 602 should result to the steps specified in the second embodiment to be performed only once in the blocks in the flat areas.

What is claimed is:

1. An image encoding apparatus that divides an image in a video into blocks made up of a plurality of pixels, and encodes the blocks, the image encoding apparatus comprising:
   a first motion vector computation unit configured to compute a first motion vector of a block to be encoded in an image; and
   a motion vector replacement unit configured to replace the first motion vector computed in the first motion vector computation unit with a second motion vector when a condition is satisfied,
   wherein the condition comprises (1) at least one of the following conditions: (i) an absolute value of the first motion vector is greater than a first threshold, and (ii) an absolute value of a difference between the first motion vector and the second motion vector is greater than a second threshold, and (2) a condition where encoding cost corresponding to the block to be encoded if the second motion vector is used is less than a third threshold.

2. The image encoding apparatus according to claim 1, wherein the second motion vector is a motion vector corresponding to one of spatially neighboring blocks already encoded.

3. The image encoding apparatus according to claim 1, wherein the second motion vector is a zero vector.

4. The image encoding apparatus according to claim 1, wherein the first threshold depends on quantization parameter values corresponding to the block to be encoded.

5. The image encoding apparatus according to claim 1, wherein the second threshold depends on quantization parameter values corresponding to the block to be encoded.

6. The image encoding apparatus according to claim 1, wherein the third threshold depends on quantization parameter values corresponding to the block to be encoded.

7. The image encoding apparatus according to claim 1, wherein the third threshold depends on flatness of the block to be encoded.

8. The image encoding apparatus according to claim 1, wherein the third threshold depends on a pixel level of the block to be encoded.

9. An image encoding apparatus that divides an image in a video into blocks made up of a plurality of pixels, and that encodes the blocks, the image encoding apparatus comprising:
   a first motion vector computation unit configured to compute a first motion vector of a block to be encoded in an image; and
   a motion vector replacement unit configured to replace the first motion vector computed in the first motion vector computation unit with a second motion vector when a first condition is satisfied,
   wherein the condition comprises (1) a first condition where an absolute value of a difference between the first motion vector and the second motion vector is greater than a threshold, and (2) a second condition where encoding cost corresponding to the block to be encoded if the second motion vector is used is less than a threshold.

10. The image encoding apparatus according to claim 9, wherein the condition further comprises a third condition where an absolute value of the first motion vector is greater than a threshold.

* * * * *